United States Patent [19]

Wessels et al.

[11] Patent Number: 5,614,319
[45] Date of Patent: Mar. 25, 1997

[54] INSULATING COMPOSITION, INSULATED PLENUM CABLE AND METHODS FOR MAKING SAME

[75] Inventors: Rob Wessels; Gary Craton; Neeli Soundararajan, all of Catawba County, N.C.

[73] Assignee: CommScope, Inc., Hickory, N.C.

[21] Appl. No.: 435,870

[22] Filed: May 4, 1995

[51] Int. Cl.$^6$ ............................. B32B 15/00; D02G 3/00
[52] U.S. Cl. .................. 428/379; 428/375; 428/378; 428/383; 174/110 F; 174/110 FC; 174/121 SR; 525/199
[58] Field of Search ................. 428/375, 378, 428/379, 383, 372; 174/120 SR, 110 FC, 110 F; 525/199

[56] References Cited

U.S. PATENT DOCUMENTS

| | | | |
|---|---|---|---|
| 4,331,619 | 5/1982 | Chung et al. | 521/79 |
| 4,394,460 | 7/1983 | Chung et al. | 521/92 |
| 4,680,324 | 7/1987 | Malwitz | 524/58 |
| 4,702,836 | 10/1987 | Matoh et al. | 210/500.23 |
| 4,711,811 | 12/1987 | Randa | 428/383 |
| 4,729,854 | 3/1988 | Miyata et al. | 252/609 |
| 4,737,526 | 4/1988 | Mukaiyama et al. | 521/145 |
| 4,770,937 | 9/1988 | Yagyu et al. | 428/383 |
| 4,952,428 | 8/1990 | Keogh | 428/461 |
| 4,957,961 | 9/1990 | Chandrasekaran et al. | 524/405 |
| 5,059,483 | 10/1991 | Lunk et al. | 428/383 |
| 5,167,876 | 12/1992 | Lem et al. | 252/602 |
| 5,342,553 | 8/1994 | Schubert | 252/609 |
| 5,462,803 | 10/1995 | Wessels | 428/383 |
| 5,468,782 | 11/1995 | Mehan | 428/379 |

*Primary Examiner*—Patrick Ryan
*Assistant Examiner*—J. M. Gray
*Attorney, Agent, or Firm*—Bell, Seltzer, Park & Gibson, P.A.

[57] ABSTRACT

There is disclosed an insulating composition comprising a mixture of a polyolefin, such as polyethylene or polypropylene, and a partially fluorinated copolymer such as ethylene-chlorotrifluoroethylene (ECTFE) or ethylene-trifluoroethylene (ETFE) in an amount from about 3.0% to about 50% by weight polyolefin. Such mixture may be used as either a solid or foamed insulation over a metallic conductor in a plenum-type communications cable. Such an insulation has been found to have improved mechanical and electrical properties over insulations consisting of 100% ECTFE or ETFE. Specifically, the insulation exhibits improved elongation performance and lower dielectric constant and dissipation factor values. These insulated wires may be used in the transmission of electronic signals, such as voice, data or video, and possess unique properties in electrical, fire safety and cost performance. The insulated cable is made by extruding a mixture of the polyolefin and partially fluorinated copolymer, such as ETFE or ECTFE, onto a metal conductor wire. Additional flame retardants, compatabilizing agents and processing aids may also be added to the mixture. If a foamed insulation is desired, a suitable nucleator and blowing agent may be added.

16 Claims, 1 Drawing Sheet

INSULATING COMPOSITION, INSULATED PLENUM CABLE AND METHODS FOR MAKING SAME

BACKGROUND OF THE INVENTION

This invention relates to insulating compositions. More particularly, this invention relates to insulating compositions useful for making insulated, smoke and fire resistant plenum communications cables typically used at frequencies ranging from DC up to several hundred MHZ.

Fluorocarbon polymers have been used as insulation for various purposes including plenum-type communications cables. The insulated conductors may be used alone, or as in a coaxial cable construction, or twisted with other conductors as pairs which may be combined to form a multiple pair core. The core may be coated with a jacket consisting of a fluorocarbon polymer or other flame retardant, low smoke polymer that will pass applicable regulatory requirements for plenum rated communications cables. Because of the possibility of fire and subsequent spreading of smoke within a building through the air plenum, plenum approved fire retardant, low smoke cables must be used for those applications.

Fluorocarbon polymer materials are often used as insulations because of their fire retardant properties and low smoke emissions when ignited. The electrical properties of fluorocarbon polymers are typically not as good as polyolefins, such as polyethylene or polypropylene and are more costly. The most pertinent electrical properties include the dielectric constant and dissipation factor. Dissipation factor in particular is important for cables designed to operate at frequencies in excess of 10 MHZ. The higher the dissipation factor of an insulation material the more a signal is attenuated as it is transmitted through a transmission line, such as a communications cable. The effect of dissipation factor becomes greater as the transmission frequency is increased. Fluorinated ethylene-propylene (FEP) resin is a melt processible fluoropolymer that has both good electrical properties and adequate flame and smoke performance. Due to the high cost and limited availability of FEP; alternative materials are desirable.

To lower the dielectric constant and improve the dissipation factor a foamed insulation of the polymer coating over the wire may be used. An example of such process is taught in U.S. Pat. Nos. 4,472,595 and 3,643,007 for polyolefin insulations.

An example of efforts to use fluorocarbons in cable insulation is described in co-pending application Ser. No. 65,860, filed May 21, 1993, now U.S. Pat. No. 5,462,803, which provides an insulating layer of a copolymer of ethylene and chlorotrifluoroethylene (commercially available under the trade name HALAR® copolymer and an outer layer of polyvinyl chloride.

In another example, foamed electrical insulation of ETFE and ECTFE is described in U.S. Pat. Nos. 4,331,619 and 4,394,460 wherein the process uses a chemical blowing agent and a nucleating agent. Polyethylene is added in small amounts as a processing aid. These patents do not address electrical attenuation performance, which is not adequate to meet some current 100 MHZ twisted pair applications. These patents also do not address potential degradations of the insulations mechanical properties as a result of this foaming process. Insulation elongation performance in particular is negatively impacted by foaming.

Since these insulating compositions are used in environmental conditions from about 0° C. to 60° C., the effect of temperature on electrical properties is important and specified in application standards, such as TIA/EIA 568A. Attenuation, in particular, is affected negatively by increases in temperature. ETFE and ECTFE insulated cable exhibit increases of approximately 0.6% per degree centigrade temperature increase at a frequency of 100 MHZ. This is more than twice the 0.25% increase measured when using a polyolefin or FEP insulation. While one may design a cable utilizing a foamed ETFE or ECTFE insulation that meets room temperature requirements for high frequency applications, a product that will also meet the applicable elevated temperature standards will be physically larger than desirable.

There is need for a melt processible insulation material with good physical properties that may be used as a substitute for FEP in plenum cable applications that require high performance signal transmission at frequencies in excess of 10 MHZ.

SUMMARY OF THE INVENTION

In accordance with the present invention, there is provided a foam insulating composition comprising a mixture of a polyolefin, such as polyethylene or polypropylene or copolymers of ethylene with propylene, butylene or hexene, and a partially fluorinated copolymer, such as ethylene-chlorotrifluoroethylene (ECTFE) or ethylene-trifluoroethylene (ETFE) in an amount from about 3.0% to about 50% by weight polyolefin. Such mixture may be used as either a solid or foamed insulation over a metallic conductor in a plenum-type communications cable. Such an insulation has been found to have improved mechanical and electrical properties over insulations consisting of 100% ECTFE or ETFE. Specifically, the insulation exhibits improved elongation performance and lower dielectric constant and dissipation factor values. These insulated wires may be used in the transmission of electronic signals, such as voice, data or video, and possess unique properties in electrical, fire safety and cost performance.

The insulated cable is made by extruding a mixture of the polyolefin and partially fluorinated copolymer, such as ETFE or ECTFE, onto a metal conductor. Flame retardants, compatabilizing agents and processing aids may also be added to the mixture. If a foamed insulation is desired, a suitable nucleator and/or blowing agent may be added.

It is an object of the present invention to provide an insulating composition.

Another object of the present invention is to provide an insulating composition with improved electrical and mechanical characteristics that meets applicable regulatory requirements for plenum communications cable.

Yet another object of the present invention is to provide an electrical cable for data and other communications transfer which has improved elongation and dielectric properties.

Still another object of the present invention is to provide a method for making a plenum cable having an insulating composition containing a mixture of a polyolefin and a partially fluorinated copolymer.

BRIEF DESCRIPTION OF THE DRAWINGS

Other objects, features and advantages of the present invention will become apparent from the following detailed description of the invention taken in conjunction with the drawing, in which.

DETAILED DESCRIPTION OF THE PREFERRED EMBODIMENTS

Figure 1:
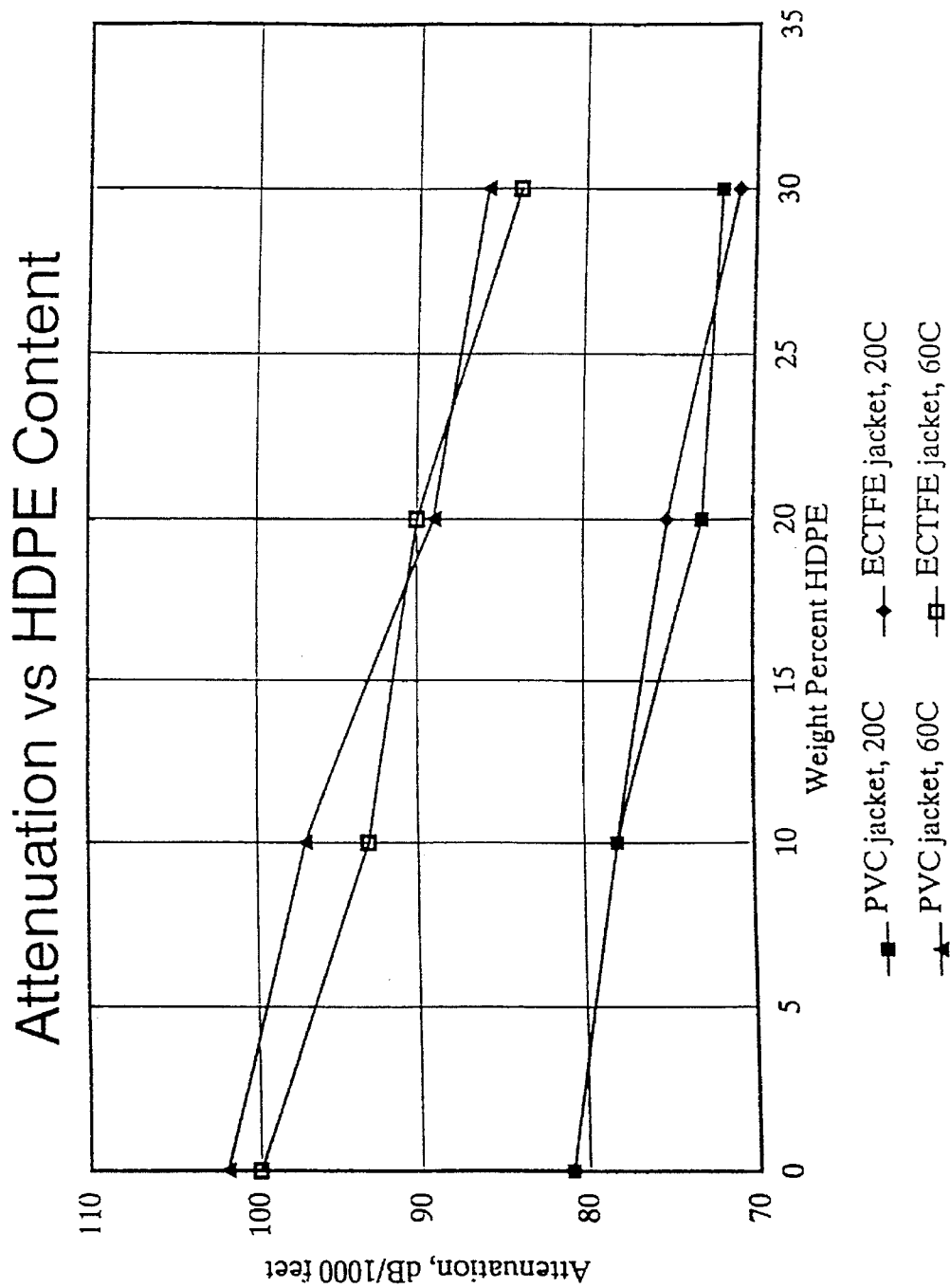
FIG. 1 illustrates attenuation vs. the amount of high density polyethylene mixed with ECTFE determined from the results of Example 2.

The present invention is to insulating compositions. The insulating compositions comprise a mixture of polyolefin and partially fluorinated copolymer, such as ethylene-trifluoroethylene (ETFE) or ethylene-chlorotrifluoroethylene (ECTFE) forming an alloy. An alloy is a homogeneous mixture wherein the atoms of one component replace or occupy positions interstitial between the atoms of the other. The compositions may be formed as a solid or a foam insulation. If a foamed insulation is desired, a blowing agent and a nucleating agent may be added to the mixture during processing.

The polyolefin may be any of a series of polymers synthesized from monomers containing 2 to 8 carbon atoms or copolymers of ethylene with other alpha olefins, such as propylene, butylene or hexene. Preferably, the polyolefin is selected from the group consisting of polyethylene, low density polyethylene, medium density polyethylene, high density polyethylene, ethylene-propylene rubber and linear low density polyethylene, and polypropylene. Preferably, the polyolefin in the mixture is from 3.0% to 50% by weight of the total mixture. Especially preferred for plenum cable is an amount of polyolefin from about 10% by weight to about 30% by weight of the total mixture.

The fluorinated copolymers useful in the present invention include ethylene-trifluoroethylene (ETFE) or ethylene-chlorotrifluoroethylene (ECTFE). These copolymers consist of 40 to 60 mole % ethylene (E) and 60 to 40 mole % tetrafluoroethylene (TFE) or cholortrifluoroethylene (CTFE). A particularly suitable fluorinated copolymer is HALAR® fluorocarbon copolymer available from Allied Chemical Corp.

When the insulating composition is to be foamed, a blowing agent is added during processing. The blowing agent may be any liquid or gas blowing agent which promotes foam formation of the composition in the case of a foamed insulation. Liquid or gas blowing agents are typically added during the extrusion process, while the mixture is in the molten state. The liquid blowing agents expand to a gas phase during processing. Chemical blowing agents are typically blended with the polymer mixture during the compounding process. There is present an effective amount of blowing agent. The term "effective amount of blowing agent" is used to indicate a sufficient amount of blowing agent to cause initial cells to form within the mixture. There can be up to 10 parts of chemical blowing agent per 100 parts of mixture. Preferably, there is from about 0.1 to about 5 parts, and more preferably from 0.5 to 3.0 parts, of blowing agent per 100 parts of mixture.

The blowing agent may be selected from any of the well-known agents. Use of a blowing agent results in a foam insulation that typically has a void content of 30% to 45% and is correspondingly smaller than an electrically equivalent solid insulation. Gas blowing agents which may be selected include, but are not limited to, nitrogen, carbon dioxide, chlorodifluoromethane (F22) or any gas mixture that is soluble in the molten mixture. Chemical blowing agents include, but are not limited to, hydrozodicarboxylates, 5-phenyl tetrazole, diesters of azodiformic acid and carbazides. The chemical blowing agents may be self-nucleating.

To ensure that a uniform, small diameter cell structure is present in foam structures, a nucleating agent is provided. The nucleating agent also provides sites for the formation of cells generated by the blowing agent. Thus, an effective amount of nucleating agent is an amount sufficient to ensure proper cell formation. There can be up to 10 parts by weight of nucleating agent, preferably from about 0.1 to 3 parts of nucleating agent per 100 parts of mixture. The nucleating agent may be selected from a group of known nucleators including, but not limited to, boron nitride, polytetrafluoroethylene, talc, calcium carbonate, barium carbonate, zinc carbonate, lead carbonate, and oxides of lead, magnesium, calcium, barium and zinc.

Other additives may be used to enhance the flame retardance, material compatibility and processing of the mixture. Useful flame retardants include, by way of example, antimony oxide. Compatibilizers include KRATON® rubber and ethylene-propylene rubber, for example. The insulating composition may also optionally contain suitable additives, such as pigments, antioxidants, thermal stabilizers, acid acceptors and processing aids. When, as is preferred, the composition is electrically insulating, any conductive fillers which are present should be used in small amounts which do not render the composition conductive.

The melt processible insulating composition may be applied to a metal conductor wire via an extrusion process. The wire may consist of any of the well-known metallic conductors, such as copper, aluminum or copper-clad steel used in wire and cable applications. The wire is preferably 18 to 26 AWG gauge. The insulation should be about 5 to about 80 mils in thickness, preferably 8 mils to 50 mils for either solid or foam insulation. When the insulation is foamed, the void content of the foam may range from 10% to 60%. A void content of 30% to 45% is preferable. The foam provides a lower dielectric constant than the solid material and reduces the weight and overall size of the finished cable.

The insulated wire may be used as a single, coaxial conductor, or twisted into pairs and made into multi-pair constructions. The assembly of conductors and shield, if present, is referred to as a cable core. A suitable polymer jacket is applied over the cable core. The jacket may be a fluoropolymer or polyvinyl chloride alloy suitable for plenum use.

It has been found that the foam produced from the composition of the present invention is flexible and can be extruded or formed to suitable shapes. In fact, it can be extruded to form any desired profile, including tubes, rods, castings and coatings.

The combination of polyolefin and partially fluorinated copolymers, such as ETFE or ECTFE, provides several construction advantages for plenum cable designs over the individual materials. Several examples are set forth below to illustrate the nature of the invention and the manner in which it is carried out. However, the invention should not be considered as being limited to the details thereof.

EXAMPLE 1

This example demonstrates the effect on important electrical properties when a polyolefin is mixed with fluoropolymers, such as ECTFE and ETFE. Mixing was accomplished in a co-rotating, twin screw laboratory extruder.

Flat plaques were compression molded from the extrudate using standard laboratory practices and electrical properties of these plaques were compared to plaques of 100%

HALAR® ECTFE copolymer. For this example, the polymers were used as received from the various manufacturers. No other components were used. The results are shown in the table below wherein the values are shown as the % reduction from the value of an insulation of 100% Halar® ECTFE copolymer.

TABLE I

| COMPOSITION | IMPROVEMENT IN PROPERTY | | | |
|---|---|---|---|---|
| | D.C.* 1 MHZ | D.F.† 1 MHZ | D.C. 50 MHZ | D.F. 50 MHz |
| 80% ECTFE, 20% HDPE | 2.9% | 20.9% | 7.7% | 25.8% |
| 60% ECTFE, 40% HDPE | 8.3% | 55.8% | 7.7% | 56.8% |
| 80% ECTFE, 20% PP | 2.9% | 27.6% | 4.9% | 29.7% |
| 80% ECTFE, 20% LLDPE | 3.3% | 27.6% | 3.4% | 29.0% |
| 80% ETFE, 20% HDPE | 4.8% | 27.9% | 4.9% | Not Determined |

*Dielectric Constant
†Dissipation Factor

In the above table, the term HDPE refers to a polymer made from ethylene and having a density greater than 0.945 grams per cubic centimeter (g/cc) or greater. PP refers to a copolymer made from propylene and ethylene, where the ethylene content is less than 25 mole %. LLDPE refers to a copolymer of ethylene and a higher alpha olefin, such as 1-hexene. Having a density less than 0.930 g/cc ECTFE refers to the copolymer made from ethylene and chlorotrifluoroethylene where the ethylene comprises 40 to 60 mole % of the polymer, ETFE is the copolymer of ethylene and tetrafluoroethylene.

The results show that adding a polyolefin to the fluoropolymer significantly lowers the dissipation factor. When used as insulation in a communications cable, a lower dissipation factor results in less attenuation at high frequencies.

EXAMPLE 2

To further illustrate the beneficial effects of polyolefin when added to the fluoropolymer, a series of mixtures were made and then extruded onto 24 AWG copper wire. Blends containing 0, 10, 20 and 30% by weight HDPE in ECTFE were prepared as solid insulation with a diameter over the insulated conductor of 0.0365 inches. The conductor diameter was 0.0201 inches.

Test cables were made from the insulated wires above by first forming twisted pairs all with a 1.02 inch lay length. The twisted pairs were formed in bunches of four pairs and then jacketed. Both ECTFE and polyvinylchloride jackets were used to provide representative data. Attenuation measurements were made on representative lengths of cable at frequencies up to 100 MHZ and at both 20° C. and 60° C. This data is shown in FIG. 1 for the 100 MHZ measurements. At frequencies of 1 MHZ and below, the effect of adding polyolefin on attenuation is slight.

Of particular note is the large affect on attenuation results at the higher temperature. For example, at 20° C., the attenuation improves by 9 to 10 Db/1000 ft. as the HDPE content increases from 0 to 30%. At 60° C. this improvement is 16 Db/100 ft. Of particular and unexpected importance is the pronounced reduction in attenuation at the higher temperature which results from the addition of polyolefin to the fluoropolymer.

EXAMPLE 3

This example illustrates a foamed insulation. To 100 parts by weight of ECTFE, was mixed 16.75 parts by weight of high density polyethylene (HDPE), 1 part by weight of a finely divided polytetrafluoroethylene (PTFE) and 0.05 parts by weight of finely divided boron nitride. The latter two components represent nucleating agents. The mixture was prepared in a twin screw extruder and chopped into pellets. This mixture was then coated onto 0.0226 diameter copper wire using a single screw extruder which had been adapted to inject nitrogen gas into the molten mixture. The insulation thus formed a closed cell form having a thickness of 9 to 10 mils and a void fraction of approximately 33 %. The electrical properties of a cable assembled from the insulated wire met the standards for the TIA/EIA 568A draft specification for Category 5 unshielded twisted pair cables.

The insulation thus produced also exhibited excellent physical properties. For example, the ultimate elongation exceeded 250%. Typically, foamed ECTFE insulation exhibits only 100% ultimate elongation.

Some materials commonly used for wire insulation are subject to thermal stress cracking. To determine whether the material of this example is susceptible, short lengths of wire were formed such that the insulated wire was tightly coiled around its own diameter. The samples thus formed were then subjected to two test regimes. In the first, six samples were subjected to a constant temperature of 100° C. for twelve days. No cracking of the insulation was evident to an unaided eye. In the second procedure, six samples were temperature cycled from –40° C. to +150° C. and back to –40° C. four times per day for ten days. Again no cracking of the insulation was evident. Thus, the material of this example does not appear to be subject to thermal stress cracking.

EXAMPLE 4

A series of polyolefins were melt-blended with two fluoropolymer resins and then examined for thermal properties using a Perkin Elmer DSC-7. The properties measured were melting temperature ($T_m$) and heat of fusion ($\Delta H$). This data are shown below as Table II.

TABLE II

| COMPOSITION | $T_{m1}$ °C. | $T_{m2}$ °C. | $\Delta H_1$ J/g | $\Delta H_2$ J/g |
|---|---|---|---|---|
| HDPE | 126.9 | | 162.5 | |
| PP | 168.0 | | 57.9 | |
| ECTFE | | 240.3 | | 35.7 |
| TEFZEL ® HT-2136 | | 257.4 | | 36.2 |
| 20% HDPE/ECTFE | 124.9 | 240.5 | 15.6 | 33.3 |
| 20% PP/ECTFE | 162.2 | 238.6 | 11.8 | 27.3 |
| 20% HDPE/ECTFE | 125.0 | 255.8 | 17.4 | 36.7 |

Of particular note is the effect that the polyolefin has on both the measured melting temperature ($T_{m2}$) and the heat of fusion ($\Delta H_2$) of the fluoropolymer portion of the mixtures. The thermograms show two distinct melting events. One of these—$T_{m2}$—is typically larger and shifted in temperature when compared to what one would expect from the data on the neat polymers. For example, note the mixture containing 20% HDPE in ECTFE. The ECTFE comprises only 80% of the sample but the heat of fusion is 93.3% of that of the ECTFE. And the melt temperature of this fraction is increased. This implies that an additional structure has been developed or an existing structure has been greatly modified. The sample is found to contain crystalline polyethylene regions, crystalline ECTFE regions, amorphous regions and a third crystalline region. This strongly implies that some polyethylene has co-crystallized with the ECTFE.

These results imply a considerable degree of thermodynamic compatibility. The material may justifiably be called an alloy or inter penetrating network (IPN).

EXAMPLE 5

A series of polyolefins were melt blended with ECTFE and then examined for ultimate elongation and tensile strength. Results are shown in Table IV.

TABLE IV

| COMPOSITION | Tensile Strength, psi | Elongation, % |
|---|---|---|
| 100% ECTFE | 7200 | 400 |
| 10% HDPE + 90% ECTFE | 7100 | 410 |
| 15% HDPE + 85% ECTFE | 6700 | 440 |
| 20% HDPE + 80% ECTFE | 6300 | 445 |
| 25% HDPE + 75% ECTFE | 5500 | 460 |
| 10% PP + 90% ECTFE | 6400 | 410 |
| 20% PP + 80% ECTFE | 5600 | 410 |
| 25% LLDPE + 75% ECTFE | 4600 | 360 |

For this table, the terms and definitions are as in Example 1. Of particular note is the increase in ultimate elongation as the HDPE content is increased. For purposes of making a communications cable, this increase is of value (see Example 3). The decrease in tensile strength may be helpful in some cases, especially if insulation displacement type connectors are to be used.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. An electrical cable comprising
    at least one pair of twisted wires each wire thereof having a conductor covered with an insulating composition comprising an alloy of from about 10% to about 50% by weight of said alloy of a polyolefin selected from the group consisting of polyethylene, polypropylene, high density polyethylene, medium density polyethylene, low density polyethylene, ethylene-propylene rubber, linear low density polyethylene and copolymers of ethylene with other alpha olefins, and
    the balance of said alloy being a partially fluorinated copolymer selected from the group consisting of ethylene-trifluoroethylene and ethylene-chlorotrifluoroethylene.

2. The electrical cable according to claim 1 wherein said insulating composition has a thickness from about 5 mils to about 80 mils.

3. The electrical cable according to claim 1 wherein said twisted wire are 18 to 26 AWG gauge size.

4. The electrical cable according to claim 1 wherein said partially fluorinated copolymer is a copolymer of ethylene and chlorotrifluoroethylene, the copolymer having between 40 and 60 mole % of ethylene units and correspondingly between about 60 and about 40 mole % of tetrafluoroethylene or chlorotrifluoroethylene units.

5. The electrical cable according to claim 1 wherein said partially fluorinated copolymer is ethylene-trifluoroethylene.

6. The electrical cable according to claim 1 wherein said polyolefin is a polyethylene.

7. The electrical cable according to claim 1 wherein said twisted pair of wires is jacketed with a composition selected from the group consisting of fluoropolymers and polyvinylchloride.

8. The electrical cable according to claim 7 further comprising a plurality of pairs of twisted wires.

9. An electrical cable comprising
    at least one pair of twisted wires each wire thereof having a conductor covered with an insulating composition comprising
    a mixture forming an alloy of from about 10% to about 30% by weight of said alloy of a polyethylene, and the balance of said alloy being a partially fluorinated copolymer selected from the group consisting of ethylene-trifluoroethylene and ethylene-chlorotrifluoroethylene and
    said at least one pair of twisted wires being jacketed with a composition selected from the group consisting of fluoropolymers and polyvinylchloride.

10. An electrical cable comprising
    at least one pair of twisted wires each wire thereof having a conductor covered with a foamed insulating composition comprising
    an alloy of from about 10% to about 50% by weight of said alloy of a polyolefin selected from the group consisting of polyethylene, polypropylene, high density polyethylene, medium density polyethylene, low density polyethylene, ethylene-propylene rubber, linear low density polyethylene and copolymers of ethylene with other alpha olefins, and
    the balance of said alloy being a partially fluorinated copolymer selected from the group consisting of ethylene-trifluoroethylene and ethylene-chlorotrifluoroethylene.

11. The electrical cable according to claim 10 wherein said partially fluorinated copolymer is a copolymer of ethylene and chlorotrifluoroethylene, the copolymer having between 40 and 60 mole % of ethylene units and correspondingly between about 60 and about 40 mole % of tetrafluoroethylene or chlorotrifluoroethylene units.

12. The electrical cable according to claim 10 wherein said partially fluorinated copolymer is ethylene-trifluoroethylene.

13. The electrical cable according to claim 10 wherein said polyolefin is a polyethylene.

14. The electrical cable according to claim 10 wherein said at least one pair of twisted wires is jacketed with a composition selected from the group consisting of fluoropolymers and polyvinylchloride.

15. The electrical cable according to claim 14 further comprising at least a plurality of pairs of twisted wires.

16. An electrical cable comprising
    at least one pair of twisted wires each wire thereof having a conductor covered with a foamed insulating composition comprising
    an alloy of from about 10% to about 30% by weight of said alloy of a polyethylene, and the balance of said alloy being a partially fluorinated copolymer selected from the group consisting of ethylene-trifluoroethylene and ethylene-chlorotrifluoroethylene and
    said at least one pair of twisted wires being jacketed with a composition selected from fluoropolymers and polyvinylchloride.

\* \* \* \* \*

UNITED STATES PATENT AND TRADEMARK OFFICE
CERTIFICATE OF CORRECTION

PATENT NO. : 5,614,319

DATED : March 25, 1997

INVENTOR(S) : Rob Wessels, et al.

It is certified that error appears in the above-identified patent and that said Letters Patent is hereby corrected as shown below:

On the title page, Column 1, U.S. Patent References, line 4, delete "Matoh" and insert --Mutoh--. therefor.

On the title page, Column 1, U.S. Patent References, line 3, add --4,650,815 3/1987 Namba et al.--

Column 1, line 55, after "HALAR®" insert --fluorocarbon--.

Column 2, line 16, after "is" insert --a--.

Column 5, line 5, delete "Halar®" and insert --HALAR®-- therefor.

Column 5, line 13, in the sub-heading, last column, delete "Mhz" and insert --MHZ-- therefor.

Column 5, line 25, delete "copolymers" and insert --copolymer-- therefor.

Column 5, line 56, delete "affect" and insert --effect-- therefor.

Column 6, line 37, delete "are" and insert --is-- therefor.

Column 7, lines 4 and 6, delete IV" and insert --III-- therefor.

UNITED STATES PATENT AND TRADEMARK OFFICE
CERTIFICATE OF CORRECTION

PATENT NO. : 5,614,319
DATED : March 25, 1997
INVENTOR(S) : Rob Wessels, et al

It is certified that error appears in the above-indentified patent and that said Letters Patent is hereby corrected as shown below:

Column 7, line 50, delete "wire" and insert --wires-- therefor.

Signed and Sealed this

Sixteenth Day of September, 1997

Attest:

BRUCE LEHMAN

Attesting Officer

Commissioner of Patents and Trademarks